Figure 1:
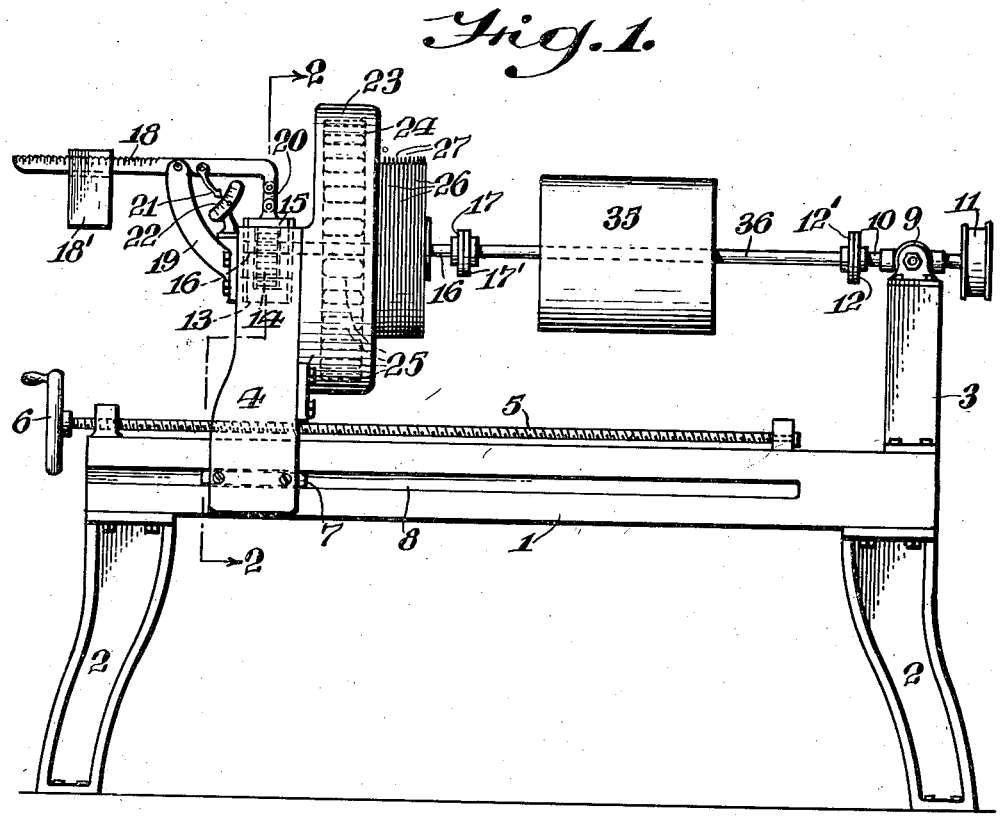

G. W. SWIFT, Jr. & C. B. RODGERS.
METHOD OF DETECTING AND CORRECTING A LACK OF DYNAMIC BALANCE WITHIN AND WHILE A BODY IS ROTATING.
APPLICATION FILED FEB. 28, 1917.

1,262,999.

Patented Apr. 16, 1918.
2 SHEETS—SHEET 1.

Inventors
George W. Swift, Jr., &
Charles B. Rodgers,
by J. Stuart Freeman,
Attorney

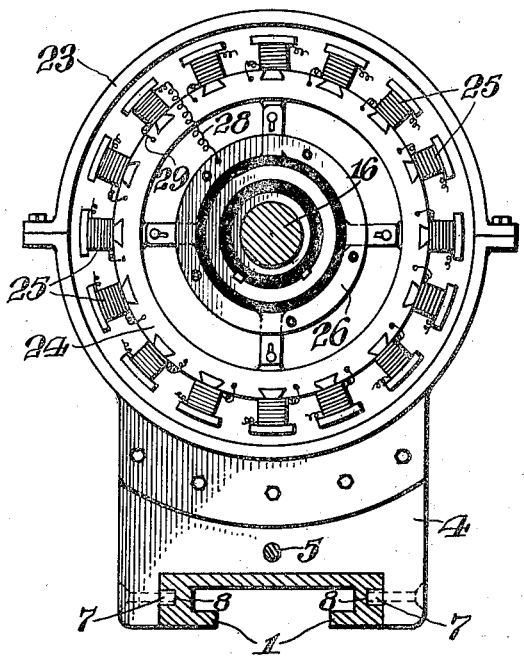
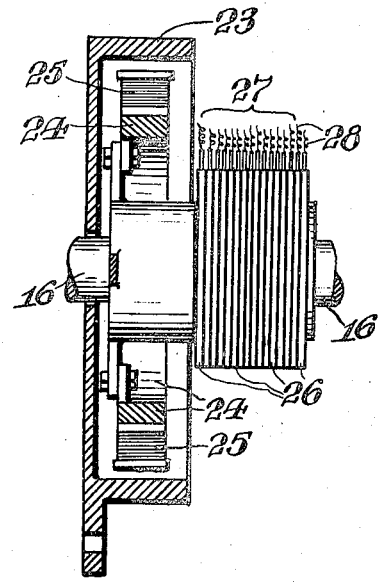
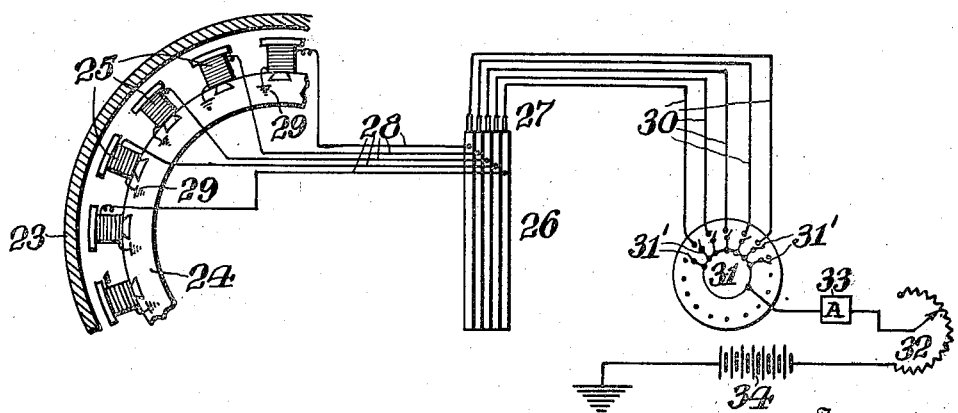

UNITED STATES PATENT OFFICE.

GEORGE W. SWIFT, JR., AND CHARLES B. RODGERS, OF BORDENTOWN, NEW JERSEY.

METHOD OF DETECTING AND CORRECTING A LACK OF DYNAMIC BALANCE WITHIN AND WHILE A BODY IS ROTATING.

1,262,999.   Specification of Letters Patent.   Patented Apr. 16, 1918.

Application filed February 28, 1917. Serial No. 151,488.

*To all whom it may concern:*

Be it known that we, GEORGE W. SWIFT, Jr., and CHARLES B. RODGERS, citizens of the United States, residing at Bordentown, in the county of Burlington and State of New Jersey, have invented certain new and useful Improvements in the Methods of Detecting and Correcting a Lack of Dynamic Balance Within and While a Body is Rotating, of which the following is a specification.

The object of this invention is to provide a method whereby rotatable bodies are balanced without resorting to the use of shiftable weights, etc., but entirely by the selective employment of variable magnetic forces.

Another object is to provide a novel type of mechanism designed to detect and correct even a small lack of perfect balance in a rotatable body while the same is revolving, and in accordance with the improved method.

While the term "balance" often suggests the comparison of a given body with a standard weight, while the two are simultaneously being acted upon by gravity, we are not here concerned with this operation. On the contrary, we are concerned with those forms of "balance" which influence the action of certain bodies in motion, particularly bodies designed to rotate at relatively high speeds.

As thus interpreted, "balance" is of two kinds, namely, "static, and kinetic or dynamic", the former having to do with the condition wherein the center of gravity of a rotating body lies upon its axis of rotation, but at the same time may by vibrating indicate the existence of moments, which deflect the major axis of the ellipsoid of inertia angularly with respect to and out of coincidence with the axis of rotation, the point of their intersection however being also the center of gravity of said body.

Kinetic, or dynamic, "balance" is as the name implies, a condition of a body wherein a hypothetical condition of static balance exists, and at the same time is characterized by such an ideal condition while running, that whatever the shape of each of its elements, their respective centers of gravity lie upon their common axis of rotation, and there are present no centrifugal bending moments, thus indicating a coincidence of the major axis of the momental ellipsoid with the axis of rotation. Such a condition is of course difficult to obtain perfectly, but it can be approached so nearly that for all practical purposes a body is finally said to be dynamically balanced.

Of the few devices heretofore conceived for thus balancing a body while rotating, the only successful types have been those wherein weights are shifted longitudinally of the axis of rotation of said body, or along an axis parallel thereto, while said body and weights are in synchronous rotation, not considering the static balancing machine, which comprises weights shiftable longitudinally of an axis perpendicular to the axis of rotation of the body being tested.

However, certain difficulties arising in the construction of the machines above referred to make it advisable to change the construction and operation as well, to lessen the number of movable parts, and to eliminate all shifting weights. In this new device neither gravity nor centrifugal forces are required to actuate that part of the device effecting the balancing of the unbalanced body, wherefore said actuation may take place against the force of gravity while the movable elements of the device are stationary, and by said elements remaining perfectly balanced both statically and dynamically no centrifugal forces are required while revolving to influence the operation.

In general then the operation of this device depends upon the magnetic attraction of one or more selected poles of a constantly dynamically balanced field for an armature normally positioned at a uniform distance therefrom, said attraction when at the correct position and of the correct intensity operating to exactly counter-balance the bending couples in an unbalanced body rotating simultaneously therewith upon parallel or coincident axes and upon a common yielding support.

Figure 2:
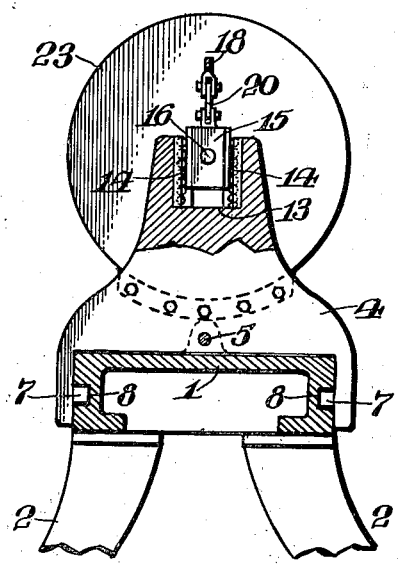

In describing this new method of balancing even in its broadest conception reference is made for the sake of clarity to the mechanism shown in the accompanying drawings in which Figure 1 is a front elevation of a device for balancing rotatable bodies according to the said improved method; Fig. 2 is a section on the line 2—2 of Fig. 1; Fig. 3 is a right-hand side elevation of the electrical elements of the device; Fig. 4 is a vertical section through the field and armature of the same; and Fig. 5 is a diagram of the electrical connections.

Referring to the drawings, a base 1, supported by legs 2, is provided with an upwardly extending fixed post 3 and an adjustable post 4, adapted to be shifted longitudinally of said base by a screw 5 revolubly mounted in ears upon the former, and controlled by a handwheel 6, said latter post being prevented from vibration with respect to said bed by means of unitary extensions 7 carried by the former and slidably engaging the sides of lateral grooves 8 in the latter.

Upon the post 3 is secured an oscillatable bearing 9 through which is journaled a shaft 10 carrying a flanged belt pulley 11, or other suitable means for imparting motion thereto, and a face plate 12. The adjustable post 4, on the other hand, is provided with a recess 13 in its upper portion lined upon the upwardly extending parallel sides thereof with roller bearings 14, adapted to guide a block 15 in which is journaled a shaft 16, carrying a face plate 17.

The natural tendency of said block unsupported is downwardly, wherefore it, together with the additional weights impressed upon it, is counter-balanced by a graduated lever 18 pivotally supported by a bracket 19 and carrying a slidably adjustable weight 18' the inner end of said lever being connected to said block by a link 20, and the oscillatory motion of the former being indicated by the movement of a pointer 21 with respect to a graduated segment 22 carried by said lever and said post, respectively.

To the inner side of the post 4 is rigidly secured a circular, soft iron armature 23, within which is normally concentrically positioned a field 24 comprising pole pieces 25 with their respective windings grounded at one end and at their other ends connected consecutively to collector rings 26 against which slidably contact brushes 27. The said revolving field is secured to the shaft 16 and shifts the latter out of its normal position concentric with the said armature, as hereinafter described.

Referring to Fig. 5 a group of the field's pole pieces 25 are shown, each connected to one of a series of collector rings 26 by wires 28 and grounded by wires 29. The individual brushes 27 contact with said rings and thence by wires 30 are connected to contact points of a series of suitable switches 31 upon the face of a dial, which by its similarity to the arrangement of the poles of the armature, directly indicates which are magnetized when the latter is in a definite position, as for instance when the pole piece 25 is uppermost to correspond with its controlling switch 31.

Between the several switches upon the dial face and a suitable "ground" is a variable resistance 32, an ammeter 33 and a suitable source of energy 34, which latter must be essentially constant in its E. M. F. and capable of a relatively wide range of current values. With this arrangement, any one or more of the field magnets can be energized at will and be made to develop a variable number of lines of magnetic force upon altering the resistance 32, and the pull of such energized pole or poles is both positive and steady regardless of whether the said field is stationary or revolving at a high speed.

In the operation of such a device as that described, a previously statically balanced rotatable body 35 is secured upon a shaft 36, and the latter by means of face plates 12' and 17' is secured to and in alinement with the shafts 10 and 16. Power is then applied to revolve the pulley 11 and connected shafts with the said body 35 and the field 24 secured thereto. If in addition to being previously balanced statically, said body is also dynamically balanced, the shaft 16 and block 15 will not vibrate and therefore no movement of the pointer 21 will be apparent.

However, if said body is but imperfectly balanced, the pointer will oscillate to a greater or less degree, and this movement is either increased or diminished as current is passed through the pole piece coils by closing the corresponding dial switches selectively. Finally, a combination of switches is found together with a definite amount of current, at which all vibration of the pointer ceases and perfectly smooth running of the parts is attained.

The device is then stopped and the position and intensity of the neutralizing magnetic forces are respectively observed and computed from the reading of the instruments, after which from practice, computation, or tables, there are found suitable positions on the said body from which a definite amount of material when removed (or an equal amount added at a point diametrically opposite thereto) will create a condition of perfect dynamic balance, as proved by again rotating the device as before, when no vibration will be evident.

Having thus described our invention, what we claim and desire to protect by Letters Patent of the United States is:—

1. The method of counter-balancing the weight of a body mounted upon a yielding support, by setting in opposition thereto an electro-magnet also mounted upon said support and magnetically coöperating with a fixed armature, while said body and magnet are revolving synchronously.

2. The method which consists in associating a dynamically unbalanced body with a dynamically balanced electro-magnetic body so that the two may be revolved synchronously with the latter in proximity to a fixed armature, thus forming a dynamically unbalanced system, and then magnetizing said last-named body to neutralize the unbalanced condition of said first body to balance said system.

3. The method which consists in associating a dynamically unbalanced body with a dynamically balanced electro-magnetic body so that the two may be revolved synchronously with the latter in proximity to a fixed armature, thus forming a dynamically unbalanced system, and then magnetizing said last-named body while said system is in motion, to neutralize the unbalanced condition of said first body to balance said system.

4. The method which consists in associating upon movable axes a dynamically unbalanced body with a dynamically balanced electro-magnetic body so that the two may be revolved synchronously with the latter in proximity as an armature having a fixed axis, thus forming a dynamically unbalanced system, and then magnetizing a portion of said last-named body while said system is in motion, to neutralize the unbalanced condition of said first body to balance said system.

5. The method which consists in associating upon a common movable axis a dynamically unbalanced body with a dynamically balanced electro-magnetic body so that the two may be revolved synchronously with the latter in proximity to an armature having a fixed axis, thus forming a dynamically unbalanced system, and then selectively magnetizing certain portions of said last-named body while said system is in motion, to neutralize the unbalanced condition of said first body to balance said system.

6. The method of revolubly counterbalancing a body and an electro-magnet about a common shiftable axis, the magnet being in inductive relation to a fixed armature, such method consisting in energizing said magnet to create a force acting between said magnet and said armature to oppose centrifugal forces within said body.

7. The method of revolubly counterbalancing a body and an electro-magnet about a common shiftable axis, the magnet being in inductive relation to a fixed armature, such method consisting in energizing said magnet while said body and said magnet are in motion, to create a force acting between said magnet and said armature to oppose centrifugal forces within said body.

8. The method of revolubly counterbalancing a body and an electro-magnet about a common shiftable axis, the magnet being in inductive relation to a fixed armature, such method consisting in variably energizing said magnet to create a force acting between said magnet and said armature to oppose centrifugal forces within said body to a varying degree.

9. The method of revolubly counterbalancing a body and an electro-magnet about a common shiftable axis, the magnet being in inductive relation to a fixed armature, such method consisting in variably energizing said magnet to create a force acting between said magnet and said armature to oppose centrifugal forces within said body to a varying degree, while said body and electro-magnet are revolving synchronously.

10. The method of counterbalancing a body about a common axis with an electro-magnet, the latter being adjacent to a fixed armature, such method consisting in revolving the said body and magnet together as one system, and then varying the strength of said magnet to counterbalance centrifugal couples in said body.

11. The method of counterbalancing a dynamically unbalanced body about a common shiftable axis with a dynamically balanced electro-magnet, the latter being adjacent to a fixed armature, such method consisting in revolving the said body and magnet together as one system, and then varying the strength of said magnet to counterbalance centrifugal couples in said body.

12. The method of counterbalancing a dynamically unbalanced body about a common shiftable axis with a dynamically balanced electro-magnet, the latter being adjacent to a fixed armature, such method consisting in revolving the said body and magnet together as one system, and then varying the strength of said magnet to counterbalance centrifugal couples in said body, while said body and electro-magnet are in motion.

13. The method of counterbalancing a body about a common shiftable axis with a rotatable series of circumferentially distributed electro-magnets, the latter being adjacent to a fixed armature, such method consisting in revolving said body and said series of magnets as one system, and then energizing one or more of said magnets to attract said armature and shift said axis, to oppose centrifugal couples within said body.

14. The method of counterbalancing a body about a common shiftable axis with a rotatable series of circumferentially distributed electro-magnets, the latter being adjacent to a fixed armature, such method consisting in revolving said body and said series of magnets as one system, and then variably energizing one or more of said magnets to attract said armature and shift said axis, while said system is revolving, to oppose centrifugal couples within said body.

In testimony whereof we have affixed our signatures.

GEORGE W. SWIFT, Jr.
CHARLES B. RODGERS.

Witnesses:
HAROLD B. WELLS,
H. H. BARTLETT.